US008614862B1

(12) United States Patent
Shimizu et al.

(10) Patent No.: US 8,614,862 B1
(45) Date of Patent: Dec. 24, 2013

(54) PERPENDICULAR MAGNETIC RECORDING MEDIA HAVING A CAP LAYER ABOVE A GRANULAR LAYER

(71) Applicant: HGST Netherlands B.V., Amsterdam (NL)

(72) Inventors: Masayoshi Shimizu, Chigasaki (JP); Hiroyuki Nakagawa, Yokohama (JP); Shun Tonooka, Odawara (JP); Yoshinori Honda, Hiratsuka (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/725,219

(22) Filed: Dec. 21, 2012

(51) Int. Cl.
G11B 5/66 (2006.01)
G11B 5/82 (2006.01)

(52) U.S. Cl.
USPC ......... 360/135; 428/831; 428/833; 428/833.3

(58) Field of Classification Search
USPC ............... 360/131, 135; 428/831, 833, 833.3
See application file for complete search history.

(56) References Cited

U.S. PATENT DOCUMENTS

| | | | |
|---|---|---|---|
| 7,169,488 B2 | 1/2007 | Chen et al. | |
| 7,195,827 B2 | 3/2007 | Maeda et al. | |
| 7,807,278 B2* | 10/2010 | Sugimoto et al. | 428/828.1 |
| 8,000,060 B2 | 8/2011 | Zhang et al. | |
| 8,110,298 B1 | 2/2012 | Choe et al. | |
| 2005/0142387 A1* | 6/2005 | Araki et al. | 428/694 BS |
| 2006/0088733 A1* | 4/2006 | Hosoe et al. | 428/827 |
| 2006/0088737 A1 | 4/2006 | Hirayama et al. | |
| 2006/0269797 A1 | 11/2006 | Lu et al. | |
| 2007/0037016 A1 | 2/2007 | Do et al. | |
| 2010/0159284 A1 | 6/2010 | Choe et al. | |
| 2010/0209737 A1 | 8/2010 | Bian et al. | |
| 2011/0097603 A1* | 4/2011 | Onoue | 428/827 |
| 2012/0250186 A1* | 10/2012 | Irisawa et al. | 360/110 |

FOREIGN PATENT DOCUMENTS

| | | |
|---|---|---|
| JP | 2006-302426 | 11/2006 |
| JP | 2008-090918 | 4/2008 |
| JP | 2011014191 | 1/2011 |
| JP | 2011014204 | 1/2011 |
| JP | 2011096307 | 5/2011 |
| JP | 2011-192326 | 9/2011 |

OTHER PUBLICATIONS

Tanahashi, K, "Dual Segregant Perpendicular Recording Media With Graded Properties," IEEE Transactions on Magnetics, vol. 45, No. 2, Feb. 2009, pp. 799-804 (abstract only).

(Continued)

Primary Examiner — Jefferson Evans
(74) Attorney, Agent, or Firm — Zilka-Kotab, PC

(57) ABSTRACT

In one general embodiment, a perpendicular magnetic recording medium includes a ferromagnetic granular layer with perpendicular magnetic anisotropy and having a granular structure; and a cap layer above said granular layer, the cap layer being a ferromagnetic continuous layer with perpendicular magnetic anisotropy, wherein, near a first side of said granular layer nearest the cap layer. Surfaces of the ferromagnetic grains of said granular layer facing the cap layer each have a domed shape defining undulations along the first side. Indentations in said ferromagnetic grains are filled by the oxide of the grain boundary in a vicinity of the first side of said granular layer. Undulations on a granular layer side of said cap layer are flatter than the undulations of the ferromagnetic grains on the first side of said granular layer.

20 Claims, 8 Drawing Sheets

(56) References Cited

OTHER PUBLICATIONS

Choe et al., "Writeability Enhancement in Perpendicular Magnetic Multilayered Oxide Media for High Areal Density Recording," IEEE Transactions on Magnetics, vol. 47, No. 1, Jan. 2011, pp. 55-62 (abstract only).

Victora, R. H., "Exchange coupled composite media for perpendicular magnetic recording," IEEE Transactions on Magnetics, vol. 41, No. 10, Oct. 2005, pp. 2828-2833 (abstract only).

Wang et al., "Exchange coupled media for perpendicular magnetic recording," IEEE Transactions on Magnetics, vol. 41, No. 10, Oct. 2005, pp. 3181-3186 (abstract only).

Suess et al., "Exchange spring media for perpendicular recording," Applied Physics Letters, vol. 87, No. 1, Jul. 2005, pp. 012504-012504/3 (abstract only).

Nemoto et al., "Designing magnetics of capped perpendicular media with minor-loop analysis," 2008 Elsevier B.V., Journal of Magnetism and Magnetic Materials, vol. 320, 2008, pp. 3144-3150.

Zheng et al., "Role of Oxygen Incorporation in Co—Cr—Pt—Si—O Perpendicular Magnetic Recording Media," 2004 IEEE, IEEE Transactions on Magnetics, vol. 40, No. 4, Jul. 2004, pp. 2498-2500.

Tanahashi et al., "Dual Segregant Perpendicular Recording Media With Graded Properties," 2009 IEEE, IEEE Transactions on Magnetics, vol. 45, No. 2, Feb. 2009, pp. 799-804.

Nemoto et al., "Designing magnetics of capped perpendicular media with minor-loop analysis," 2008 Elsevier B.V., 2008 Journal of Magnetism ad Magnetic Materials, vol. 320, pp. 3144-3150.

\* cited by examiner

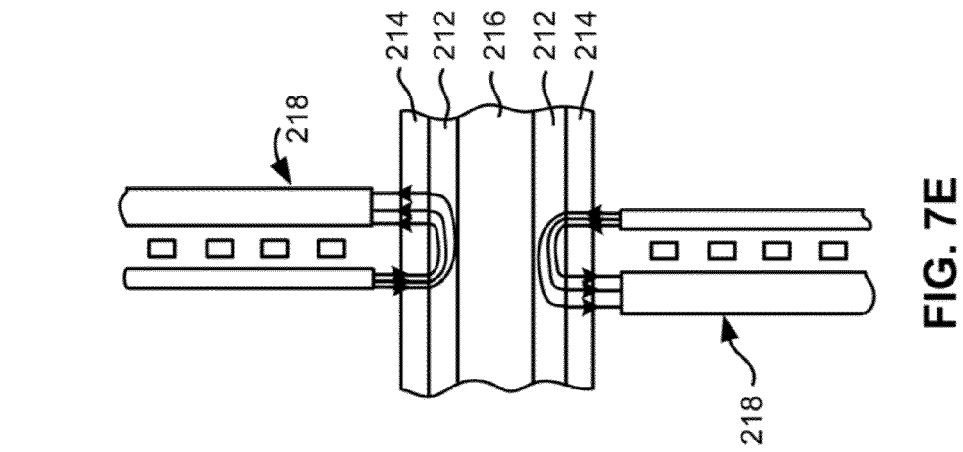
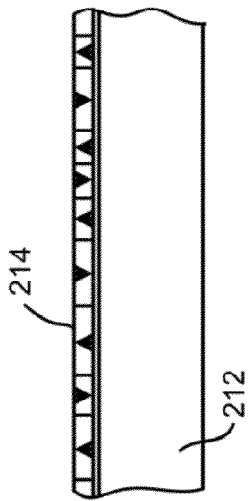
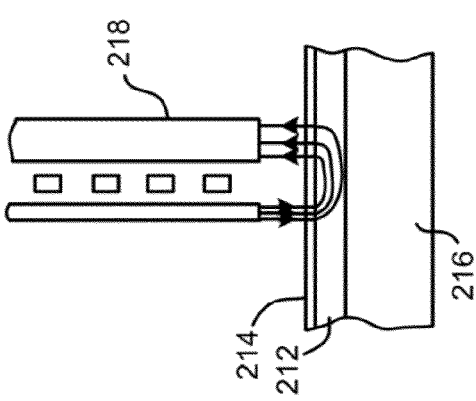
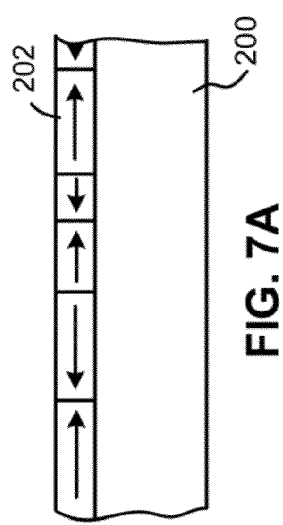
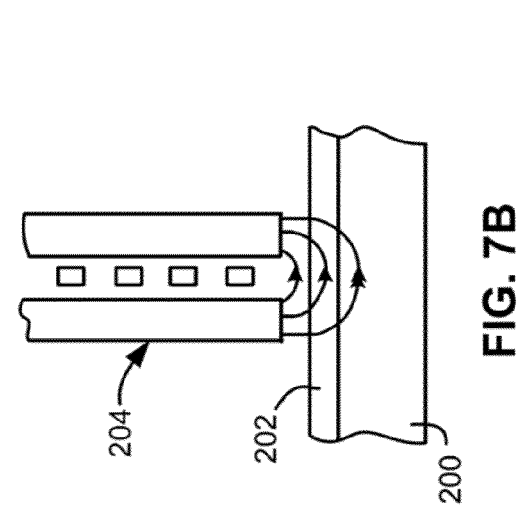

PERPENDICULAR MAGNETIC RECORDING MEDIA HAVING A CAP LAYER ABOVE A GRANULAR LAYER

FIELD OF THE INVENTION

The present invention relates to magnetic storage media, and more particularly, this invention relates to magnetic recording media having an increased recording density.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The volume of information processing in the information age is increasing rapidly. In particular, it is desired that HDDs be able to store more information in their limited area and volume. A technical approach to this desire is to increase the capacity by increasing the recording density of the HDD. To achieve higher recording density, further miniaturization of recording bits is effective, which in turn typically requires the design of smaller and smaller components.

The further miniaturization of the various components, however, presents its own set of challenges and obstacles.

In conventional perpendicular magnetic recording media, an oxide is segregated in the grain boundary of magnetic grains in a granular layer, in an attempt to improve the resolution and increase the recording density. In addition, by ensuring that less of the oxide is present in the upper portion than the lower portion of the granular layer, conventional products reduce surface roughness to improve flyability.

Other conventional products include an incoherent switching mode to decrease the switching field of a medium by inserting an exchange coupling layer (ECL) between a cap layer and a granular layer which weakens the exchange coupling between the cap layer and granular layer. In addition, such products explore how the switching field is able to be decreased by imparting a gradation to the granular layer in such a way that the saturation magnetization (Ms) and the anisotropy energy (Ku) thereof reduces from the lower portion to the upper portion of the magnetic grains. In addition, conventional products include means for improving the initial stage growth of the cap layer which allows the thickness of the cap layer to be reduced by decreasing the grain boundary oxide amount on the cap layer side of the granular layer.

A reduction in the size of magnetic clusters which serve as a unit of magnetization switching is essential for achieving higher densification. However, there are inherent problems in conventional products due to the strong lateral exchange coupling of the cap layer, the magnetic cluster size in the recording layer constituted as a combination of the granular layer and a cap layer being larger than the cluster size in the granular layer section. Thus, while a reduction in the thickness of the cap layer has been considered as a means for reducing the magnetic cluster size, when the oxide in the top part of granular layer is reduced in order to reduce the thickness of the cap layer, an increase in the inter-granular exchange coupling of the oxide-reduced granular layer results. In turn, the magnetic cluster size of the granular layer is increased in such a way that, even if the thickness of the cap layer is reduced, the overall cluster size reduction effect in the recording layer cannot be properly produced. Moreover, as capping layer thickness decreases, the granular surface roughness of the medium increases as well, thereby negatively affecting the flyability of the head over the medium. In a layered medium which has a granular layer and a cap layer such as this, a "trade-off" relationship exists, thus hindering the goal of higher densification between the head flyability and the magnetic cluster size of such conventional products.

Thus it would be desirable to achieve both reduced cluster size and decreased surface roughness. However, this goal has heretofore been elusive.

SUMMARY

A perpendicular magnetic recording medium according to one embodiment includes a ferromagnetic granular layer with perpendicular magnetic anisotropy and having a granular structure, wherein ferromagnetic grains of said granular layer have a columnar shape and a grain boundary between the ferromagnetic grains includes an oxide; and a cap layer above said granular layer, the cap layer being a ferromagnetic continuous layer with perpendicular magnetic anisotropy, wherein, near a first side of said granular layer nearest the cap layer, a grain diameter of the ferromagnetic grains decreases and a width of the grain boundary having the oxide increases toward the first side. Surfaces of the ferromagnetic grains of said granular layer facing the cap layer each have a domed shape defining undulations along the first side. Indentations in said ferromagnetic grains are filled by the oxide of the grain boundary in a vicinity of the first side of said granular layer. Undulations on a granular layer side of said cap layer are flatter than the undulations of the ferromagnetic grains on the first side of said granular layer.

A perpendicular magnetic recording medium according to another embodiment includes a ferromagnetic granular layer with perpendicular magnetic anisotropy and having a granular structure, wherein ferromagnetic grains of said granular layer have a columnar shape and a grain boundary between the ferromagnetic grains includes an oxide; a cap layer above said granular layer, the cap layer being a ferromagnetic continuous layer with perpendicular magnetic anisotropy; and a nonmagnetic switching control layer between the granular layer and the cap layer, wherein, near a first side of said granular layer nearest the continuous layer, a grain diameter of the ferromagnetic grains decreases and a width of the grain boundary having the oxide increases toward the first side. Surfaces of the ferromagnetic grains of said granular layer facing the cap layer each have a domed shape defining undulations along the first side. Indentations in said ferromagnetic grains are filled by the oxide of the grain boundary in a vicinity of the first side of said granular layer. Undulations on a granular layer side of said cap layer are flatter than the undulations of the ferromagnetic grains on the first side of said granular layer.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 7A is a schematic representation in section of a recording medium utilizing a longitudinal recording format.

FIG. 7B is a schematic representation of a conventional magnetic recording head and recording medium combination for longitudinal recording as in FIG. 7A.

FIG. 7C is a magnetic recording medium utilizing a perpendicular recording format.

FIG. 7D is a schematic representation of a recording head and recording medium combination for perpendicular recording on one side.

FIG. 7E is a schematic representation of a recording apparatus adapted for recording separately on both sides of the medium.

DETAILED DESCRIPTION

Figure 1:
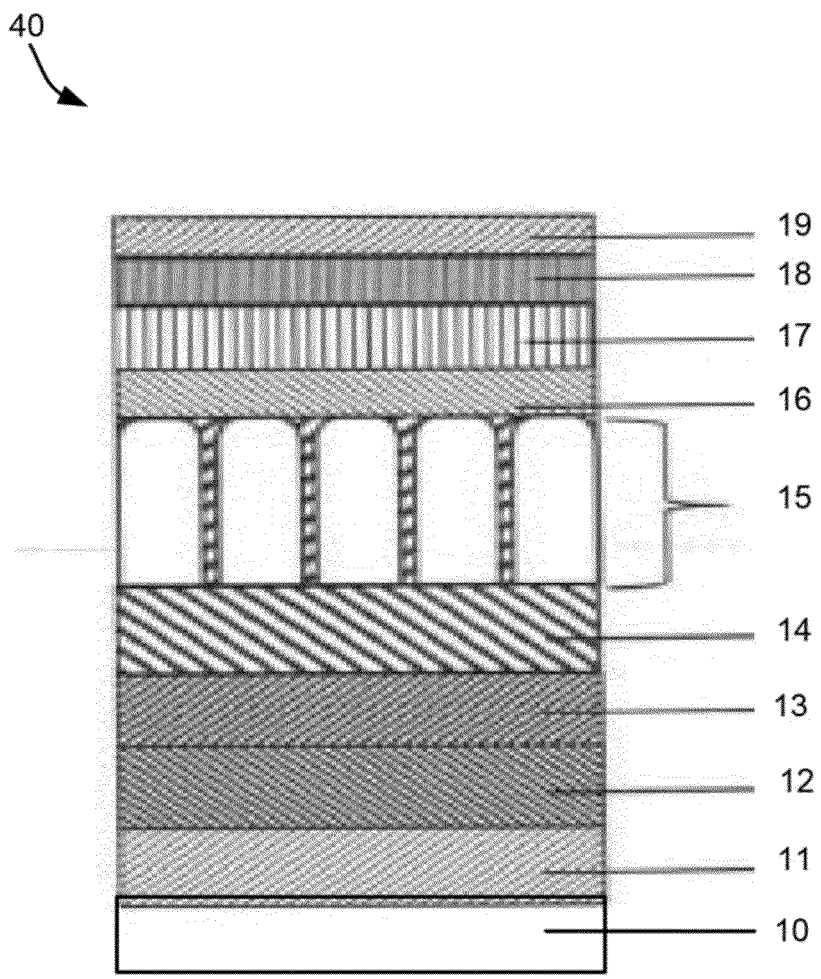
FIG. 1 is a partial cross-sectional view of a magnetic recording medium according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, a perpendicular magnetic recording medium includes a ferromagnetic granular layer with perpendicular magnetic anisotropy and having a granular structure, wherein ferromagnetic grains of said granular layer have a columnar shape and a grain boundary between the ferromagnetic grains includes an oxide; and a cap layer above said granular layer, the cap layer being a ferromagnetic continuous layer with perpendicular magnetic anisotropy, wherein, near a first side of said granular layer nearest the cap layer, a grain diameter of the ferromagnetic grains decreases and a width of the grain boundary having the oxide increases toward the first side. Surfaces of the ferromagnetic grains of said granular layer facing the cap layer each have a domed shape defining undulations along the first side. Indentations in said ferromagnetic grains are filled by the oxide of the grain boundary in a vicinity of the first side of said granular layer. Undulations on a granular layer side of said cap layer are flatter than the undulations of the ferromagnetic grains on the first side of said granular layer.

In another general embodiment, a perpendicular magnetic recording medium includes a ferromagnetic granular layer with perpendicular magnetic anisotropy and having a granular structure, wherein ferromagnetic grains of said granular layer have a columnar shape and a grain boundary between the ferromagnetic grains includes an oxide; a cap layer above said granular layer, the cap layer being a ferromagnetic continuous layer with perpendicular magnetic anisotropy; and a nonmagnetic switching control layer between the granular layer and the cap layer, wherein, near a first side of said granular layer nearest the continuous layer, a grain diameter of the ferromagnetic grains decreases and a width of the grain boundary having the oxide increases toward the first side. Surfaces of the ferromagnetic grains of said granular layer facing the cap layer each have a domed shape defining undulations along the first side. Indentations in said ferromagnetic grains are filled by the oxide of the grain boundary in a vicinity of the first side of said granular layer. Undulations on a granular layer side of said cap layer are flatter than the undulations of the ferromagnetic grains on the first side of said granular layer.

The various embodiments described and/or suggested herein preferably provide a structure and/or method that enhances the writability and the flyability which are improved by the provision of a cap layer. Furthermore, the embodiments described and/or suggested herein preferably provide a structure and/or method in which it is possible to produce magnetic clusters of a smaller size than has been possible using conventional methods.

Figure 2:
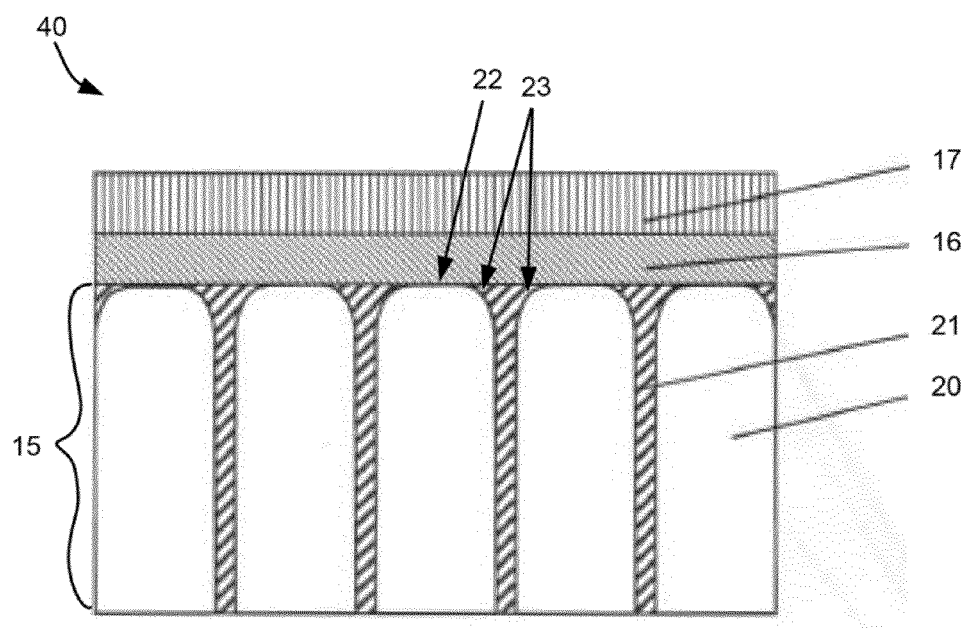
FIG. 2 is a partial cross-sectional view of a magnetic recording medium according to one embodiment.

Referring now to FIGS. 1-2, FIGS. 1-2 depict a structure 40 of a perpendicular magnetic recording medium, in accordance with one embodiment. As an option, the present structure 40 may be implemented in conjunction with features from any other embodiment listed herein, such as those described with reference to the other FIGS. Of course, however, such structure 40 and others presented herein may be used in various applications and/or in permutations which may or may not be specifically described in the illustrative embodiments listed herein. Further, the structure 40 presented herein may be used in any desired environment.

FIG. 1 shows the configuration of a structure 40, according to an exemplary embodiment of a perpendicular magnetic recording medium. The structure 40 of this perpendicular magnetic recording medium includes an adhesion layer 11, a soft magnetic underlayer 12, a seed layer 13 and an intermediate layer 14 formed above a substrate 10. As a recording layer, a granular layer 15, a switching control layer 16 and a cap layer 17 are formed in sequence thereabove, and an overcoat layer 18 and an optional lubrication layer 19 are formed in sequence above the recording layer. Of particular note is the interface shape of the granular layer 15, the switching control layer 16 and the cap layer 17. Moreover, the structure 40 may include any number and/or orientation of additional layers, which would be apparent to one skilled in the art upon reading the present description. Furthermore, there are no particular limitations to the materials or the method employed for the manufacture of such additional layers, provided the objective of their fabrication remains the same and/or similar to those of the structures described herein.

The detailed view of structure 40 depicted in FIG. 2 illustrates the granular layer 15, the switching control layer 16 and the cap layer 17. The granular layer 15 includes a granular structure in which a ferromagnetic material is preferably used to form columnar shaped ferromagnetic grains 20. The granular layer 15 may be a ferromagnetic granular layer, preferably having perpendicular magnetic anisotropy. Moreover, the grain boundaries 21 are precipitated in the spaces between the ferromagnetic grains 20 and may include an oxide. According to a preferred approach, the cap layer 17 may be a ferromagnetic continuous layer with perpendicular magnetic anisotropy, thereby preferably improving writability, flyability, switching field distribution (SFD), etc.

As described above, the grains 20 preferably include a ferromagnetic material with perpendicular magnetic anisotropy. However, provided the oxide grain boundary is a structure which is filled with an oxide, there are no particular limitations to the materials that the grains may include. For example, according to various approaches, while the ferromagnetic grains 20 may be fabricated from an alloy of Co as a main component and Cr, Pt, B, Mo, Nb, Ta, Ni, Ru, etc., a segregated magnetic alloy of one or more types of oxide selected from Si, Ti, Ta, Nb, B, W, Cr, etc. may be employed for the oxide grain boundaries 21. Preferably, the oxide grain boundaries 21 are non-magnetic.

With continued reference to FIGS. 1-2, the ferromagnetic grains 20 are characterized in that near a first side 22 of the granular layer nearest the cap layer, a grain diameter of the ferromagnetic grains decreases and a width of the grain boundaries 21 having the oxide increases toward the first side. Moreover, surfaces of the ferromagnetic grains of the recording layer facing the cap layer each have a domed shape, thereby defining undulations (e.g., an uneven surface) along the first side. In some approaches, the domed shape of at least some of the granular layer facing the cap layer may have a flattened portion near a center thereof, but is not limited thereto. In view of the present description, the center typically resides near or along the longitudinal axis of the grain, but its location may vary depending on the desired embodiment. The oxide grain boundaries 21 in the vicinity of the surface of the granular layer 15 are characterized in being formed to fill the grooves produced by the aforementioned undulations in the domed ferromagnetic grains 20 at the granular layer surface, thereby creating a relatively flatter surface than would be observed without such filling. Illustrative examples of methods for forming structures having such layers and grains are included herein and will be discussed in further detail below (e.g., see method 50 of FIG. 3). In a preferred approach, undulations on a granular layer side of the cap layer 17 may be flatter than the undulations of the ferromagnetic grains on the first side 22 of the recording layer.

Moreover, the switching control layer 16 may include an oxide. In one approach, a layer may be formed in such a way that the oxide of the grain boundary at the surface of the granular layer may act as the switching control layer. In another approach the switching control layer may include an oxide layer which is later-deposited, e.g., after the oxide of the grain boundary has been formed. In one approach, the switching control layer 16 may cover the whole surface of the ferromagnetic grains in its entirety. However according to other approaches, the oxide layer may be formed above only a portion or portions of the ferromagnetic grains, e.g., not the entire surface thereof. Thus in an illustrative approach, the middle portion of the dome of the ferromagnetic grains may be uncovered.

As mentioned above, the switching control layer 16 may include a non-magnetic or weak ferromagnetic, metal and/or oxide layer which may be introduced between the granular layer 15 and the cap layer. Moreover, the strength of the exchange coupling between the cap layer and the ferromagnetic grains may be controlled by altering the ratio of 1) the switching control layer film thickness above the middle of the ferromagnetic grains when the ferromagnetic grains are covered by an oxide layer and 2) the section that is covered when the ferromagnetic grains are only partially covered. By implementing this control of the switching control layer film thickness, incoherent switching between the cap layer and the granular layer can be adjusted in a way that allows for the writability to be appropriately adjusted.

In one approach, the thickness of the switching control layer may be varied such that the thickness of the switching control layer between the ferromagnetic grains and the cap layer is thinner than the thickness of the switching control layer between the grain boundaries and the cap layer. In another approach, the switching control layer may be partitioned and/or segmented such that at least a portion of the ferromagnetic grains may be in direct contact with the cap layer while the switching control layer is present between at least the cap layer and the grain boundaries.

In a preferred approach, the film thickness of the switching control layer 16 is determined by the appropriateness of the exchange coupling between the cap layer and the granular layer. Thus, a composite structure which combines grains where the surface of the ferromagnetic grains of the granular layer couples with the cap layer and grains with a non-magnetic material enclosed therebetween to produce a switching control layer 16, may be created. According to various approaches, if the material from which the switching control layer 16 includes an oxide, one or more types of material of a group including Si, Ti, Ta, Nb, B, W, Cr, etc. may be employed as the main component oxide. Examples of a non-magnetic metal able to be employed for the non-magnetic metal film include, but are not limited to metals containing Cr, Pt, Ru, Mo, etc. Even though ferromagnetism will be exhibited by the contained material if a simplex of, for example, Co, Fe, Ni, etc. is used, because the exhibited ferromagnetic properties will either be non-magnetic or weak provided the composition ratio thereof is small, the oxide of the switching control layer may contain a material that is the same or different to the material of the oxide of the grain boundaries of the granular layer.

According to one embodiment, a continuous cap layer film with perpendicular magnetic anisotropy is fabricated on the surface of a switching control layer 16. The cap layer 17 is preferably characterized by a surface roughness that is comparable to or smoother than the surface of the switching control layer 16. A metal continuous film containing Co, as a main component, and Cr, Pt, B, Mo, Nb, Ta, Ni, Ru, etc. may be employed as the cap layer 17 according to various approaches. In addition, because the surface flatness of the switching control layer 16 is improved in some embodiments, a partially oxidized metal film may be employed as the cap layer in such embodiments.

In the granular layer 15, inter-granular exchange coupling may be reduced due to the presence of the oxide grain boundaries between the ferromagnetic grains that extend to the surface side. This facilitates a reduction in the magnetic cluster size. As a result, a high resolution can be produced, and high-density recording is possible.

In addition, while there are problems with the use of materials with large Ms in conventional products because it increases the magnetic cluster size on the upper portion of the granular layer, various embodiments presented herein allow for a material of large Ms to be successfully employed in the granular layer. In sharp contrast to conventional products, for various embodiments presented herein, if a material of large Ms is employed on the surface side, the magnetization center of gravity of the recording layer lies on the upper side. As a result, the spacing with respect to the read sensor is effectively reduced, thereby improving the signal to noise ratio (S/N) and a high resolution is able to be achieved.

The switching control layer 16 serves the role of an exchange coupling layer between the granular layer 15 and the cap layer 17 which reduces the switching field and facilitates improved writability. Furthermore, because the film thickness of an exchange coupling layer is normally constant, an identical switching field reduction effect is generated at all positions of the coupling layer. However, because the switching control layer is combined with the oxide of a section in which the grain boundary width at the cap layer-side interface of the granular layer 15 is larger, a structure in which the non-magnetic layer (comprising the switching control layer 16 and the portion of the grain boundary region 21 above each grain 20) is thicker on the peripheral portion of the grain and the non-magnetic layer is thinner on the middle portion is produced. For this reason, the exchange coupling between the granular layer and the cap layer is stronger at the center portion of the grain than at the peripheral portion.

However, when the film thickness of the switching control layer is controlled in such a way as to effect optimum exchange coupling where the magnetic field from the head is used to switch the exchange coupling of the middle portion of the grain, the exchange coupling between the cap layer of the peripheral portion of the grain is very weak, decoupling occurs, and magnetization switching is difficult to implement. That is to say, the relationship $Hn_B > Hn_A$ between a switching magnetic field $Hn_A$ required for grain switching when a perpendicular external magnetic field is applied to the center section of the grains and an external magnetic field magnitude $Hn_B$ required for switching when a perpendicular external magnetic field is applied to the peripheral portion of the grains is established. While the maximum recording magnetic field from the recording head is produced under the center of a track of the recording head and reduces in the cross-track direction, $H_A$ denotes the recording magnetic field at the center section of the head and $H_B$ denotes the recording magnetic field applied to the end of the recording head in the cross track direction of the medium in which recording is possible. In on-track recording, it is sufficient for an $H_A = Hn_A$ recording magnetic field to be imparted to the center section of those grains which constitute the region of the center of the track. On the other hand, adjacent track recording is not performed, because of the large magnetic field required by the peripheral portion of the track edge side which is constituted from the grains of the track edge of the adjacent track, the adjacent-erasure absolute value of the recording magnetic field $H_B$, from the edge of the recording head that contributes to adjacent erasure is equivalent to $H_B = Hn_B > Hn_A$. In other words, according to a preferred embodiment, in the medium, the magnetic field required for adjacent erasure is larger than the magnetic field required for on-track recording. This indicates that the recording magnetic field gradient in the cross-track direction from the gradient recording head that would be required to overwrite adjacent tracks is effectively increased, and implies that a track pitch narrowing effect has been produced. This ensures an improvement in the achievable recording density.

In a preferred approach, the cap layer 17 may be fabricated on the flat switching control layer 16 and accordingly, it can be produced as a flat surface. This results in an improvement in the head flyability, a decrease in the head-media spacing, and an improvement in each of the writability, the S/N, and the resolution. In addition, because the recording layer is covered by the flat switching control layer 16 and the cap layer 17, this has the effect of increasing the coverage of the overcoat layer 18 and improving the corrosion resistance.

Figure 3:
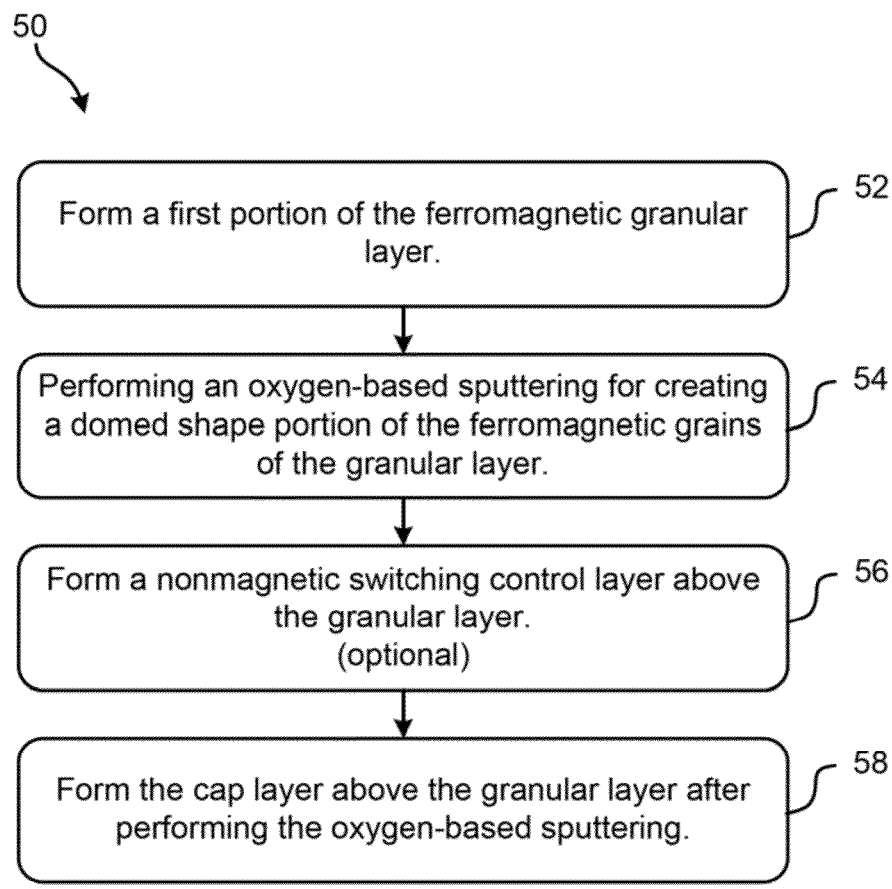
FIG. 3 is flowchart for a method according to one embodiment.

According to one exemplary embodiment, which is in no way intended to limit the invention, the dome shaped surfaces of the ferromagnetic grains facing the cap layer may be formed by sputtering. FIG. 3 depicts a method 50 for forming a perpendicular magnetic recording medium, in accordance with one embodiment. As an option, the present method 50 may be implemented in conjunction with features from any other embodiment listed herein, such as those described with reference to the other FIGS. Of course, however, such method 50 and others presented herein may be used in various applications and/or in permutations which may or may not be specifically described in the illustrative embodiments listed herein. Further, the method 50 presented herein may be used in any desired environment.

The method 50 for forming a perpendicular magnetic recording medium, according to FIG. 3, includes forming a first portion of the ferromagnetic granular layer. See operation 52. The method 50 also includes performing an oxygen-based sputtering for creating the domed shape portions of the ferromagnetic grains of the granular layer. See operation 54.

In an optional operation 56, the method 50 includes forming a nonmagnetic switching control layer above the granular layer. In one approach, the oxygen-based sputtering of operation 54 may create the switching control layer above remaining portions of the grains of the granular layer (described in further detail below). Moreover, optional operation 56 may include forming the switching control layer as a separate layer by using any process which would be apparent to one skilled in the art upon reading the present description.

With continued reference to method 50 of FIG. 3, operation 58 includes forming the cap layer above the granular layer after performing the oxygen-based sputtering. The cap layer and/or any other layer mentioned herein may be formed by plating, sputtering, physical vapor deposition (PVD), chemical vapor deposition (CVD), seed growth, etc. or any other method which would be apparent to one skilled in the art upon reading the present description, depending on the desired embodiment.

The oxygen-based sputtering in operation 54 is preferably reactive sputtering that forms the domed shape portions on previously-formed portions of the ferromagnetic grains. As the domed shape portions grow, the grain boundary is also formed, thereby defining an "indentation" 23 along each grain, as shown in FIG. 2. In the present description, indentations refer to the areas in the ferromagnetic grains where the grain boundary 21 has formed above the respective grain 20 due to the domed shape. In one approach, these indentations in the ferromagnetic grains may be filled by the oxide of the grain boundary in the vicinity of the first side of the granular layer. However, the composition of the grain boundary may be different along the differing portions of the grains, in some embodiments. Thus, the surfaces of the ferromagnetic grains of the granular layer facing the cap layer may have a shape characteristic of oxygen-based reactive bias sputtering. Thereby, in a preferred approach, the oxygen-based sputtering may cause the surfaces of the ferromagnetic grains of the recording layer facing the cap layer to each have a domed shape, as described above. Again, the oxide of the grain boundary in the indentations may have a different composition than the oxide of the grain boundary at a location farther from the first side than the indentations.

In some embodiments, portions of the cap layer directly above centers of the ferromagnetic grains have been found to be more crystalline than portions of the cap layer directly above the grain boundaries composed of oxide. Without wishing to be bound by any theory, it is believed that the crystallinity of the ferromagnetic grains, possibly in combination with the magnetic field produced by the ferromagnetic grains, may cause the increased crystallinity in the portions of the cap layer directly above centers of the ferromagnetic grains. Still without wishing to be bound by any theory, it is also believed that the amorphous characteristics of the grain boundaries may result in the lower crystallinity in the cap layer directly above the grain boundaries.

Several of the various approaches described herein were combined in conducting Working Examples 1, 2, 3 and 4, which are provided by way of example only and are in no way intended to limit the invention. Accordingly, the perpendicular magnetic recording media of Working Examples 1, 2, 3 and 4 were prepared employing a sputtering device 200LEAN manufactured by Intevac having a place of business at 3560 Bassett Street, Santa Clara, Calif., USA. Referring to the fabrication of Working Examples 1, 2, 3 and 4 and FIG. 1 for a representation of the respective components, all device chambers were evacuated to a vacuum of not more than $2\times10^{-5}$ Pa, after which a carrier with a substrate loaded thereon was moved to the process chambers for sequential implementation of the associated processes. An adhesion layer 11, a soft magnetic underlayer 12, a seed layer 13, a primary intermediate layer 14, a granular layer 15, a switching control layer 16, and a cap layer 17 were sequentially fabricated by DC magnetron sputtering on a substrate 10. Moreover, a DLC (diamond like carbon) layer was fabricated thereon as an overcoat layer 18. Finally, a lubricating agent constituted from a perfluoroalkylether-based material diluted with a fluorocarbon material was coated thereon as a liquid lubrication layer 19.

Referring now to Working Example 1, a glass substrate of thickness 0.8 mm and diameter 65 mm was employed as the substrate 10. Without heating the substrate, a 30 nm Ni-37.5 Ta adhesion layer 11 was fabricated thereon under an Ar gas pressure of 0.5 Pa and, by way of a 0.4 nm thick Ru film, a second 30 nm thick Co-34Fe-10Ta-5Zr alloy film serving as a soft magnetic underlayer 12 was then fabricated thereon under an Ar gas pressure of 0.4 Pa. A 7 nm thick Ni-6W film was fabricated thereon as the seed layer 13. As the primary intermediate layer 14, Ru was fabricated in a 4 nm thickness under an Ar gas pressure of 0.5 Pa. Ru was then fabricated in a 5 nm thickness under an Ar gas pressure of 3.3 Pa, and Ru was then fabricated in a 5 nm thickness thereon under an Ar gas pressure of 6.0 Pa. The granular layer 15 was fabricated in three layers, namely a primary granular layer, secondary granular layer and a tertiary granular layer in different chambers. The lower layer primary granular layer was fabricated to a 4 nm film thickness under an Ar gas pressure of 4 Pa and a substrate bias of 200V using a [Co-22.5Pt-10.5Cr]-2SiO$_2$-2TiO$_2$-2B$_2$O$_3$-1.5Co$_3$O$_4$ target. The intermediate secondary granular layer was fabricated in a 2 nm film thickness under a 4 Pa Ar gas pressure using a [Co-30Cr-18.5Pt]-6SiO$_2$-2.5Co$_3$O$_4$ target. The upper layer tertiary granular layer was fabricated in a 5 nm film thickness at a film formation rate of 3 nm/s under an Ar/O$_2$ mixture gas pressure of 0.9 Pa employing a [Co-24Cr-15.5Pt]-3TiO$_2$-3SiO$_2$—ICo$_3$O$_4$ target. At this time, the O$_2$ gas partial pressure in the initial stage film formation process was 0.05 Pa for 1 s. and was altered for 0.7 s to 0.1 Pa in the second part. The tertiary granular layer obtained in this way is domed, that is to say, it is constituted of ferromagnetic grains that comprise a section in which the granular diameter reduces towards the upper layer. For the switching control layer 16, a SiO$_2$ target was used, the substrate bias voltage was set to 500 V and 100 W of power was applied to the target to form a 0.2 nm film at a film-formation rate of 0.2 nm/s, after which 15 W of power was applied to the target and the substrate was exposed to a plasma for 1.5 s. At this time, the rate at which the substrate surface was etched by Ar ions attracted by a bias voltage was faster than the rate at which the SiO$_2$ was scattered from the target onto the substrate and the film was formed. Moreover, the etching of the substrate surface was performed at a rate of 0.05 nm is. Next, a 4 nm thick film was fabricated thereon as the cap layer 17, using a Co-15Cr-14Pt-8B target. Furthermore, a 3 nm thick DLC (diamond-like carbon) film was fabricated thereon as an overcoat layer 18. Finally, a lubricating agent constituted from a perfluoroalkylether-based material diluted with a fluorocarbon material was coated thereon as a lubrication layer 19.

Now referring to Working Example 2, the process employed for Working Example 2 was identical to the process employed from Working Example 1 apart from the preparation of the switching control layer 16 of the medium using a Co-35Cr-10Pt-11B target.

As Working Example 3, the film formation process of the switching control layer 16 of Working Example 2 was used, in which the substrate bias voltage was set to 500 V to apply a 100 W power to the target to manufacture a 0.1 nm film at a film formation rate of 0.2 nm/s. 15 W of power was then applied to the target and the substrate was exposed to a plasma for 2 s to prepare a medium in which the center portion of the ferromagnetic grains of the tertiary granular layer coupled with the cap layer was etched. Moreover, to accommodate the recording characteristics, the thickness of the cap layer film was 4.2 nm.

Next, while the method employed for Working Example 4 was the same as the method employed for Working Example 1, [Co-20Cr-16.5Pt]-3TiO$_2$-3SiO$_2$—ICo$_3$O$_4$ was used as a target for the film formation of the tertiary granular layer to increase the Ms of the tertiary granular layer by 50 emu/cc and prepare a 3.6 nm thick cap layer 17 film.

Referring now to Comparative Example 1, following film formation to the granular layer 15 the same as employed for Working Example 1 and in the absence of the application of a substrate bias to the switching control layer 16, a 0.125 nm thick layer was fabricated, and the cap layer 17, overcoat layer 18, and lubrication layer 19 were fabricated in the same way as in Working Example 1. Furthermore, in Comparative Example 2, following the fabrication of a granular layer 15 in the same way as for Working Example 1, film formation when fabricating the tertiary granular layer was based on an $O_2$ gas partial pressure ratio of 0.05 Pa for 1 s at the initial stage, and the use of an Ar gas only for 0.7 s in the second part. No switching control layer 16 was formed, but the cap layer 17, the overcoat layer 18 and the lubrication layer 19 were manufactured in the same way as in Working Example 1. In addition, as Comparative Example 3, a composition the same as employed in Working Example 4 was used as the tertiary granular layer target, and process the same as employed in Comparative Example 2 was used to prepare a medium with a 3.6 nm cap layer.

Figure 4:
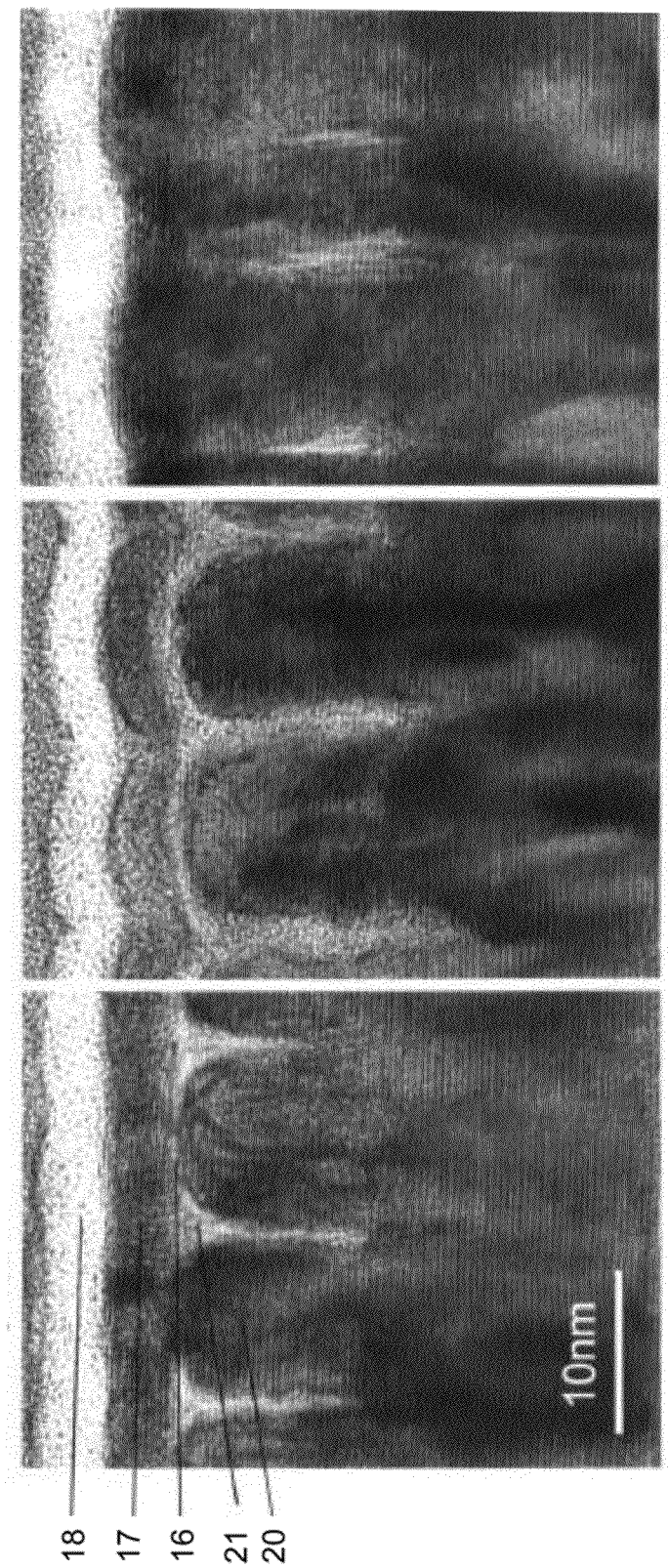
FIG. 4A is a transmission electron microscope image of a cross-section of a magnetic recording medium according to one embodiment.
FIG. 4B is a transmission electron microscope image of a cross-section of a magnetic recording medium according to a comparative example.
FIG. 4C is a transmission electron microscope image of a cross-section of a magnetic recording medium according to another comparative example.

FIG. 4A-4C show cross-sectional transmission electron microscope (TEM) images of Working Example 1, Comparative Example 1 and Comparative Example 2 respectively. In contrast to the white oxide grain boundary visible in the ferromagnetic grain boundary to the upper region of the granular layer 15 in Working Example 1 and Comparative Example 1, in Comparative Example 2 the ferromagnetic grain boundary narrows from above the middle of the granular layer and the oxide grain boundary section is hardly visible at all. In addition, it is clear in Working Example 1 and Comparative Example 1 that the granular layer apex portion of each grain is domed. In Comparative Example 1, identical undulations that trace the undulations on the surface of the granular layer are fabricated on the surface of the switching control layer 16, the cap layer 17 and the overcoat layer 18. On the other hand, in Working Example 1, the switching control layer 16 is fabricated more thickly on the oxide of the grain boundaries and on the peripheral portion of the grains and more thinly on the grain center portion to reduce the surface undulations on the granular layer 15, and the surface undulations on the switching control layer 16 are significantly smaller than the undulations on the granular layer 15 surface. It is clear that the surface of the cap layer 17 and the overcoat layer 18 are fabricated so that the undulations thereof, while smaller, trace the undulations of the switching control layer 16. On the other hand, while the interface of the granular layer 15 and the cap layer 17 of Comparative Example 2 is hard to recognize and the undulations on the surface of the granular layer cannot be recognized, the undulations on the surface of the cap layer 17 and on the surface of the overcoat layer 18 surface are smaller than the undulations of Comparative Example 1.

Table 1 presents the results of an evaluation of undulations on the lubrication film surface of the Working Examples and Comparative Examples described above, carried out employing an atomic force microscope. As supported by the data in Table 1, the roughness of the Working Examples is significantly less than the roughness of Comparative Example 1, and is comparatively less than Comparative Examples 2 and 3.

Based on these results, oxide segregation is stimulated by increasing the partial pressure ratio of the $O_2$ at the gas surface side during fabrication of the tertiary granular layer, and a granular layer comprising ferromagnetic grains with dome-shaped apex portions is able to be fabricated. While undulations on the surface of the granular layer are larger in the dome-shaped ferromagnetic grains, the oxide layer projecting above the ferromagnetic grains can be selectively etched to flatten the surface of the switching control layer 16 by the application of a high bias voltage to the substrate to etch the switching control layer 16. As a result, the grain boundaries of the granular layer of the ferromagnetic grains of the medium of the Working Example 1 extend to the surface side of the granular layer, and flatness of each of the cap layer and the overcoat layer surface is rendered possible.

TABLE 1

|  | Ra (nm) | TD (mW) |
| --- | --- | --- |
| Working Example 1 | 0.38 | 81.0 |
| Working Example 2 | 0.39 | 81.3 |
| Working Example 3 | 0.38 | 81.1 |
| Working Example 4 | 0.39 | 81.2 |
| Comparative Example 1 | 0.65 | 75.2 |
| Comparative Example 2 | 0.42 | 80.1 |
| Comparative Example 3 | 0.41 | 80.1 |

Figure 5:
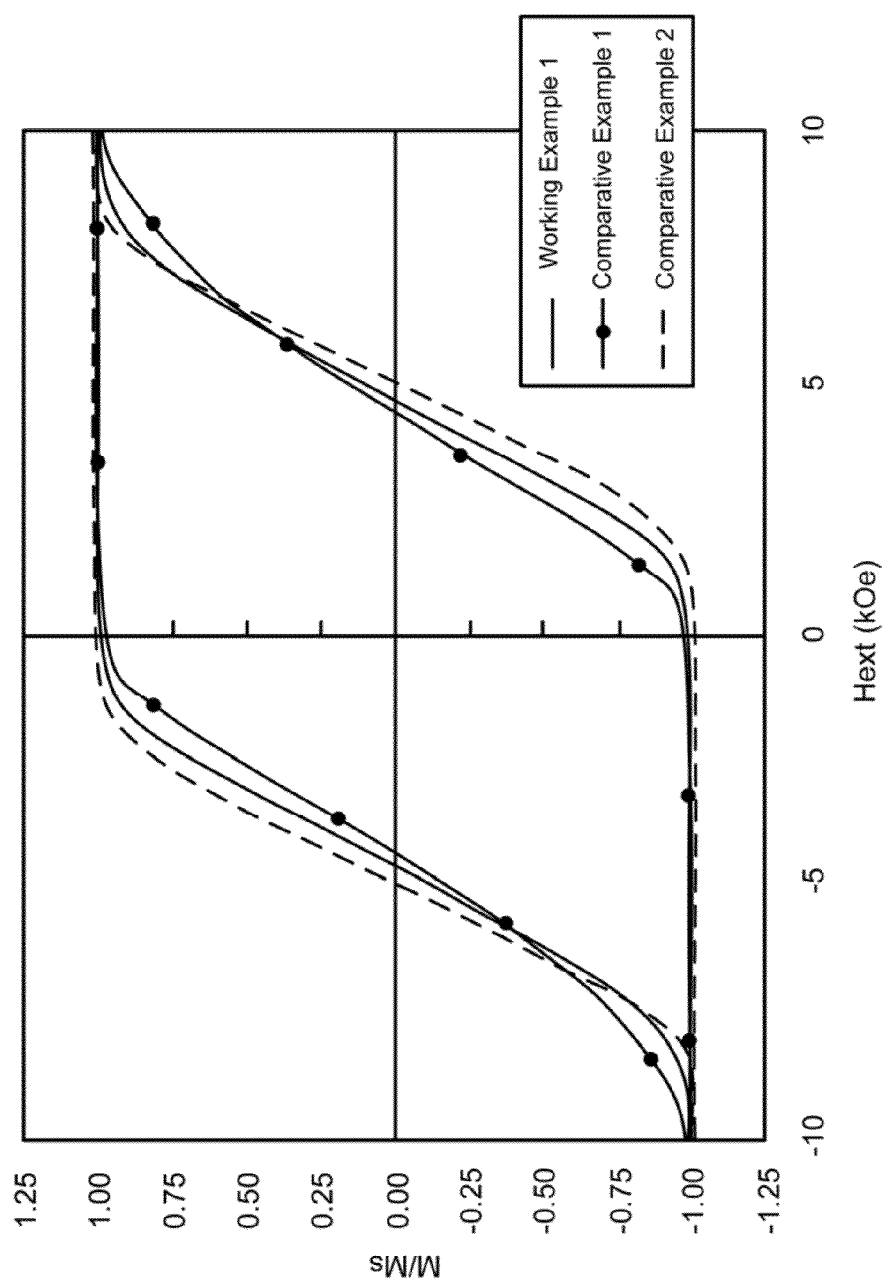
FIG. 5 is a graph of the magnetization curves for various magnetic recording media.

Referring now to FIG. 5, the graph illustrates the magnetization curves of Working Example 1, Comparative Example 1 and Comparative Example 2. The magnetization curve described by Working Example 1 lies between the magnetization curves described by Comparative Example 1 and Comparative Example 2. Because the lateral exchange coupling of the granular layers of Working Example 1 and Comparative Example 1 is less than the lateral exchange coupling of the granular layer of Comparative Example 2, the SFD and loop bias thereof is greater. However, because the exchange coupling between the granular layer and the cap layer is stronger and more appropriately controlled at the middle of the ferromagnetic grains by the switching control layer 16 in Working Example 1 than in Comparative Example 1, Working Example 1 is unlike Comparative Example 1, in which complete decoupling occurs between the granular layer and the cap layer. Thus the curve of FIG. 5 describes a long tail-shape in the vicinity of the saturation magnetic field.

On the other hand, Table 2 shows the results of magnetic cluster size employing minor loop analysis. The particulars of this measurement method are well known and are described in, for example, the following reference (H. Nemoto, et al., "Designing magnetic of capped perpendicular media with minor-loop analysis", J. MMM, 320 (2008) 3144-3150). Saturation magnetization Ms values were measured employing a vibrating sample magnetometer (VSM), employed for the absolute value correction of magnetization. As shown in Table 2, the cluster size as measured for the Working Examples and for Comparative Example 1 was comparatively smaller than measured for Comparative Example 2. These results indicate that the magnetic cluster size is able to be reduced by extending the grain boundary to the surface section of the granular layer. In addition, while the results obtained for Working Example 4 were essentially the same as Working Example 1, the magnetic cluster size of Comparative Example 3 was comparatively wider and larger than for Comparative Example 2. This suggests that, even if a material of large Ms is employed in the upper portion of the granular layer, the magnetic cluster size is unlikely to be increased according to the structure of the preferred embodiments described and/or suggested herein.

TABLE 2

|  | <D> (nm) |
| --- | --- |
| Working Example 1 | 23 |
| Working Example 2 | 23.3 |
| Working Example 3 | 23.2 |
| Working Example 4 | 23.4 |
| Comparative Example 1 | 23.1 |
| Comparative Example 2 | 28.3 |
| Comparative Example 3 | 32.5 |

According to another illustrative embodiment, a spinstand was employed to evaluate the recording and reproducing characteristics of the medium, the results of which are listed in Table 3 below. According to the illustrative embodiment, a magnetic head having a single pole-type recording device of evaluation track width 70 nm and a reproducing device utilizing a track width 60 nm tunnel magneto-resistance effect was employed. Moreover, the circumferential velocity was 10 m/sec, the skew angle was 0°, and the evaluation was performed with a magnetic spacing of approximately 8 nm.

Referring back to Table 1, the flyability of the medium was evaluated on the basis of the touch-down power (TD) of a TFC (Thermal Fly-height Control). Touch-down power denotes the power=Electric power applied until a TFC device affixed to a head slider comes into contact with the surface of the medium. This implies that, the larger the TD value, the more the head is pressed down to the region of the surface of the medium and the more the head-medium spacing is able to be reduced and, in turn, the better the flyability. The Working Examples exhibited a large TD and, in addition, a high SNR and resolution, and a narrow MWW (magnetic write width) and erase band. On the other hand, because of the low TD and the large spacing between the head and the recording layer of Comparative Example 1, the SNR and Resolution were markedly reduced. The fact that the TD of Comparative Examples 2 and 3 was of the same order as that employed for the Working Examples, and that there was no difference in spacing therebetween, reflects the difference in magnetic cluster size, in addition to an inferior SNR and resolution than for the Working Examples. In addition, it reflects the tendency for magnetization switching caused by the magnetic field in the vicinity of the center of the ferromagnetic grains to occur more readily in the ferromagnetic grains of the Working Examples and, in turn, the comparatively larger MWW and Erase Band of Comparative Examples 1 and 2, than the Working Examples, These results demonstrate that surface flatness and a reduced inter-granular exchange are possible at the same time in the granular layer of the Working Examples and, furthermore, demonstrate that a high density recordable medium can be produced by limiting the extent of writing in the crosstrack direction.

TABLE 3

|  | SNR (dB) | Resolution (%) | Erase band (nm) | MWW (nm) |
| --- | --- | --- | --- | --- |
| Working Example 1 | 25.8 | 30.2 | 4 | 65 |
| Working Example 2 | 25.9 | 30.0 | 5 | 66 |
| Working Example 3 | 25.7 | 30.1 | 5 | 64 |
| Working Example 4 | 26.1 | 29.9 | 4 | 68 |

Figure 6:
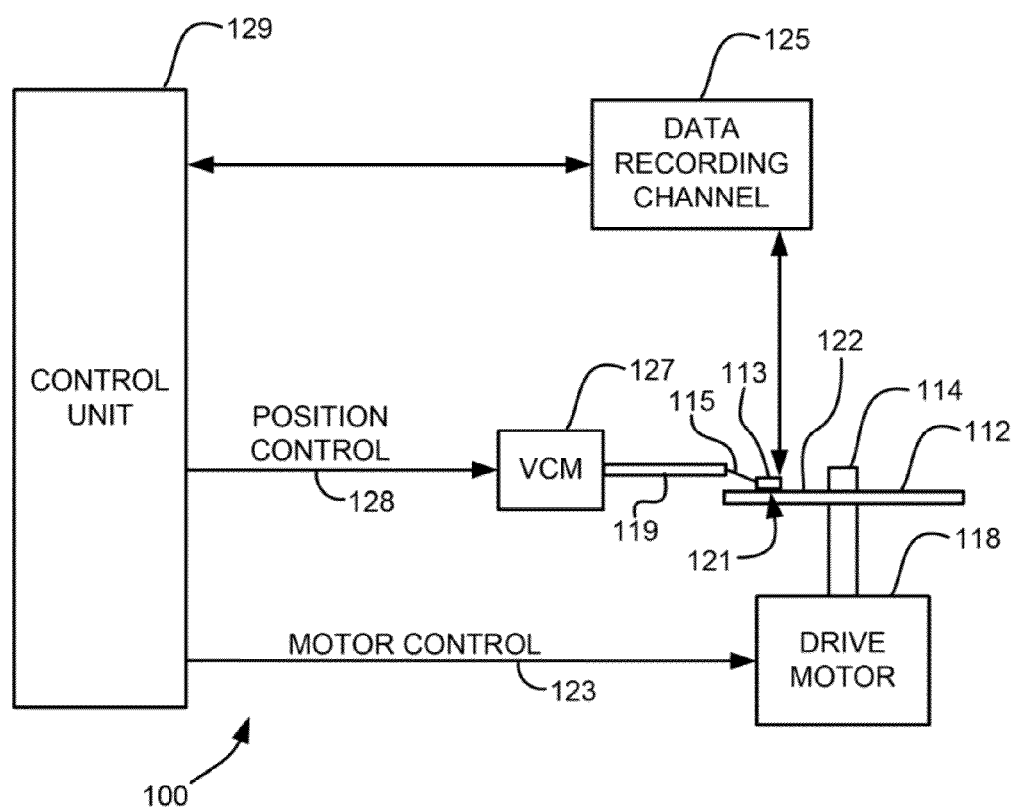
FIG. 6 is a simplified drawing of a magnetic recording disk drive system.

Referring now to FIG. 6, there is shown a disk drive 100 in accordance with one illustrative embodiment. As shown in FIG. 6, at least one rotatable magnetic disk 112 is supported on a spindle 114 and rotated by a drive mechanism which may include a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 6 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by controller 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 6 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

FIG. 7A illustrates, schematically, a conventional recording medium such as used with magnetic disc recording systems, such as that shown in FIG. 6. This medium is utilized for recording magnetic impulses in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

FIG. 7B shows the operative relationship between a conventional recording/playback head 204, which may preferably be a thin film head, and a conventional recording medium, such as that of FIG. 7A.

FIG. 7C illustrates, schematically, the orientation of magnetic impulses substantially perpendicular to the surface of a recording medium as used with magnetic disc recording systems, such as that shown in FIG. 6. For such perpendicular recording the medium typically includes an under layer 212 of a material having a high magnetic permeability. This under layer 212 is then provided with an overlying coating 214 of magnetic material preferably having a high coercivity relative to the under layer 212.

FIG. 7D illustrates the operative relationship between a perpendicular head 218 and a recording medium. The recording medium illustrated in FIG. 7D includes both the high permeability under layer 212 and the overlying coating 214 of magnetic material described with respect to FIG. 7C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

FIG. 7E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 8A:
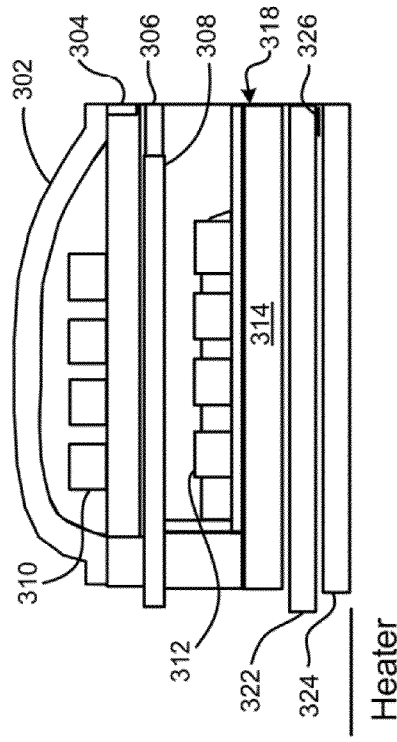
FIG. 8A is a cross-sectional view of one particular embodiment of a perpendicular magnetic head with helical coils.

FIG. 8A is a cross-sectional view of a perpendicular magnetic head. In FIG. 8A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 8B:
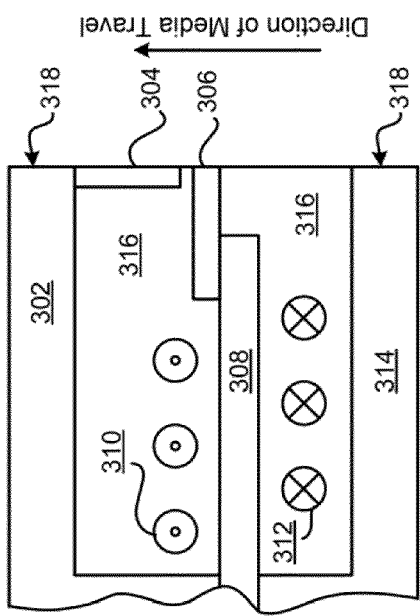
FIG. 8B is a cross-sectional view of one particular embodiment of a piggyback magnetic head with helical coils.

FIG. 8B illustrates a piggyback magnetic head having similar features to the head of FIG. 8A. Two shields 304, 314 flank the stitch pole 308 and main pole 306. Also sensor shields 322, 324 are shown. The sensor 326 is typically positioned between the sensor shields 322, 324.

Figure 9A:
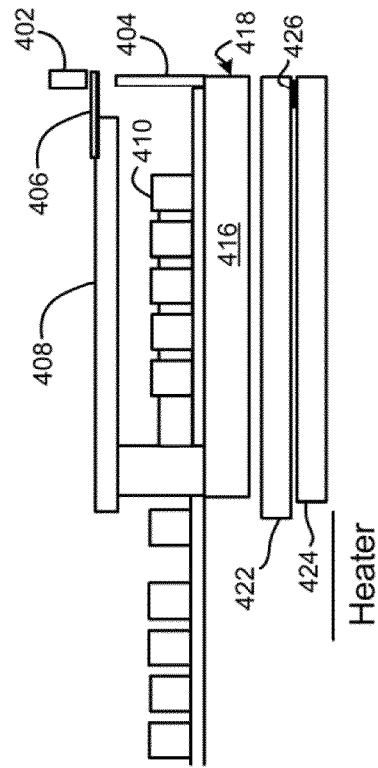
FIG. 9A is a cross-sectional view of one particular embodiment of a perpendicular magnetic head with looped coils.

FIG. 9A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 9B:
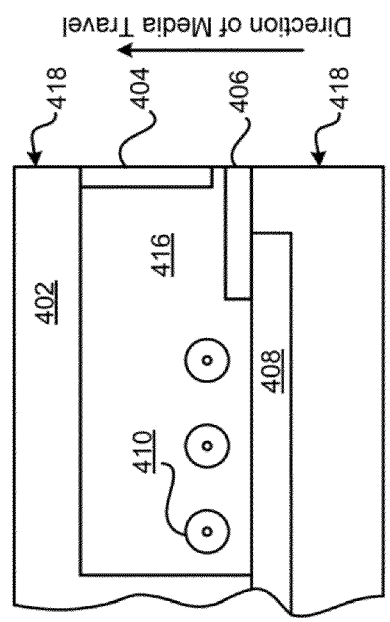
FIG. 9B is a cross-sectional view of one particular embodiment of a piggyback magnetic head with looped coils.

FIG. 9B illustrates another type of piggyback magnetic head having similar features to the head of FIG. 9A including a looped coil 410, which wraps around to form a pancake coil. Also, sensor shields 422, 424 are shown. The sensor 426 is typically positioned between the sensor shields 422, 424.

In FIGS. 7B and 8B, an optional heater is shown near the non-ABS side of the magnetic head. A heater (Heater) may also be included in the magnetic heads shown in FIGS. 7A and 8A. The position of this heater may vary based on design parameters such as where the protrusion is desired, coefficients of thermal expansion of the surrounding layers, etc.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A perpendicular magnetic recording medium, comprising:
    a ferromagnetic granular layer with perpendicular magnetic anisotropy and having a granular structure, wherein ferromagnetic grains of said granular layer have a columnar shape and a grain boundary between the ferromagnetic grains includes an oxide; and
    a cap layer above said granular layer, the cap layer being a ferromagnetic continuous layer with perpendicular magnetic anisotropy,
    wherein, near a first side of said granular layer nearest the cap layer, a grain diameter of the ferromagnetic grains decreases and a width of the grain boundary having the oxide increases toward the first side,
    wherein surfaces of the ferromagnetic grains of said granular layer facing the cap layer each have a domed shape defining undulations along the first side,
    wherein indentations in said ferromagnetic grains are filled by the oxide of the grain boundary in a vicinity of the first side of said granular layer, and
    wherein undulations on a granular layer side of said cap layer are flatter than the undulations of the ferromagnetic grains on the first side of said granular layer.

2. The perpendicular magnetic recording medium as recited in claim 1, further comprising a nonmagnetic switching control layer between the granular layer and the cap layer.

3. The perpendicular magnetic recording medium as recited in claim 1, wherein the oxide of the grain boundary in the indentations has a different composition than the oxide of the grain boundary at a location farther from the first side than the indentations.

4. The perpendicular magnetic recording medium as recited in claim 1, wherein at least some of the surfaces of the ferromagnetic grains of the granular layer facing the cap layer have a flattened portion near a center thereof.

5. The perpendicular magnetic recording medium as recited in claim 1, wherein the surfaces of the ferromagnetic grains of the granular layer facing the cap layer have a shape characteristic of oxygen-based reactive bias sputtering.

6. The perpendicular magnetic recording medium as recited in claim 1, wherein portions of the cap layer directly above centers of the ferromagnetic grains are more crystalline than portions of the cap layer directly above the grain boundaries.

7. A magnetic data storage system, comprising:
at least one magnetic head;
a perpendicular magnetic recording medium as recited in claim 1;
a drive mechanism for passing the magnetic medium over the at least one magnetic head; and
a controller electrically coupled to the at least one magnetic head for controlling operation of the at least one magnetic head.

8. A method for forming a perpendicular magnetic recording medium as recited in claim 1, the method comprising:
forming a first portion of the ferromagnetic granular layer;
performing an oxygen-based sputtering for creating the domed shape of the ferromagnetic grains of the granular layer; and
forming the cap layer above the granular layer after performing the oxygen-based sputtering.

9. The method as recited in claim 8, further comprising forming a nonmagnetic switching control layer above the granular layer.

10. The method as recited in claim 9, further comprising forming the cap layer above the switching control layer, wherein portions of the cap layer above centers of the ferromagnetic grains are more crystalline than portions of the cap layer above the grain boundaries.

11. A perpendicular magnetic recording medium, comprising:
a ferromagnetic granular layer with perpendicular magnetic anisotropy and having a granular structure, wherein ferromagnetic grains of said granular layer have a columnar shape and a grain boundary between the ferromagnetic grains includes an oxide;
a cap layer above said granular layer, the cap layer being a ferromagnetic continuous layer with perpendicular magnetic anisotropy; and
a nonmagnetic switching control layer between the granular layer and the cap layer,
wherein, near a first side of said granular layer nearest the continuous layer, a grain diameter of the ferromagnetic grains decreases and a width of the grain boundary having the oxide increases toward the first side,
wherein surfaces of the ferromagnetic grains of said granular layer facing the cap layer each have a domed shape defining undulations along the first side,
wherein indentations in said ferromagnetic grains are filled by the oxide of the grain boundary in a vicinity of the first side of said granular layer, and
wherein undulations on a granular layer side of said cap layer are flatter than the undulations of the ferromagnetic grains on the first side of said granular layer.

12. The perpendicular magnetic recording medium as recited in claim 11, wherein the switching control layer completely covers the ferromagnetic grains, wherein the switching control layer includes an oxide.

13. The perpendicular magnetic recording medium as recited in claim 11, wherein the oxide of the grain boundary in the indentations has a different composition than the oxide of the grain boundary at a location farther from the first side than the indentations.

14. The perpendicular magnetic recording medium as recited in claim 11, wherein at least some of the surfaces of the ferromagnetic grains of the granular layer facing the cap layer have a flattened portion near a center thereof.

15. The perpendicular magnetic recording medium as recited in claim 11, wherein the surfaces of the ferromagnetic grains of the granular layer facing the cap layer have a shape characteristic of oxygen-based reactive bias sputtering.

16. The perpendicular magnetic recording medium as recited in claim 11, wherein portions of the cap layer directly above centers of the ferromagnetic grains are more crystalline than portions of the cap layer directly above the grain boundaries.

17. A magnetic data storage system, comprising:
at least one magnetic head;
a perpendicular magnetic recording medium as recited in claim 11;
a drive mechanism for passing the magnetic medium over the at least one magnetic head; and
a controller electrically coupled to the at least one magnetic head for controlling operation of the at least one magnetic head.

18. A method for forming a perpendicular magnetic recording medium as recited in claim 11, the method comprising:
forming a first portion of the ferromagnetic granular layer;
performing an oxygen-based sputtering for creating the domed shape of the ferromagnetic grains of the granular layer; and
forming the cap layer above the granular layer after performing the oxygen-based sputtering.

19. The method as recited in claim 18, further comprising forming the switching control layer above the granular layer.

20. The method as recited in claim 19, further comprising forming the cap layer above the switching control layer, wherein portions of the cap layer above centers of the ferromagnetic grains are more crystalline than portions of the cap layer above the grain boundaries.

* * * * *

UNITED STATES PATENT AND TRADEMARK OFFICE
CERTIFICATE OF CORRECTION

PATENT NO.         : 8,614,862 B1  
APPLICATION NO.    : 13/725219  
DATED              : December 24, 2013  
INVENTOR(S)        : Shimizu et al.

Page 1 of 1

It is certified that error appears in the above-identified patent and that said Letters Patent is hereby corrected as shown below:

In the specification:

col. 10, line 29 replace "nm is." with --nm/s.--.

Signed and Sealed this
Eighteenth Day of March, 2014

Michelle K. Lee
*Deputy Director of the United States Patent and Trademark Office*